April 16, 1968   B. M. JAREMUS   3,377,941
REFRIGERATOR WITH MEAT AGING AND TENDERIZING COMPARTMENT
Filed Oct. 14, 1965
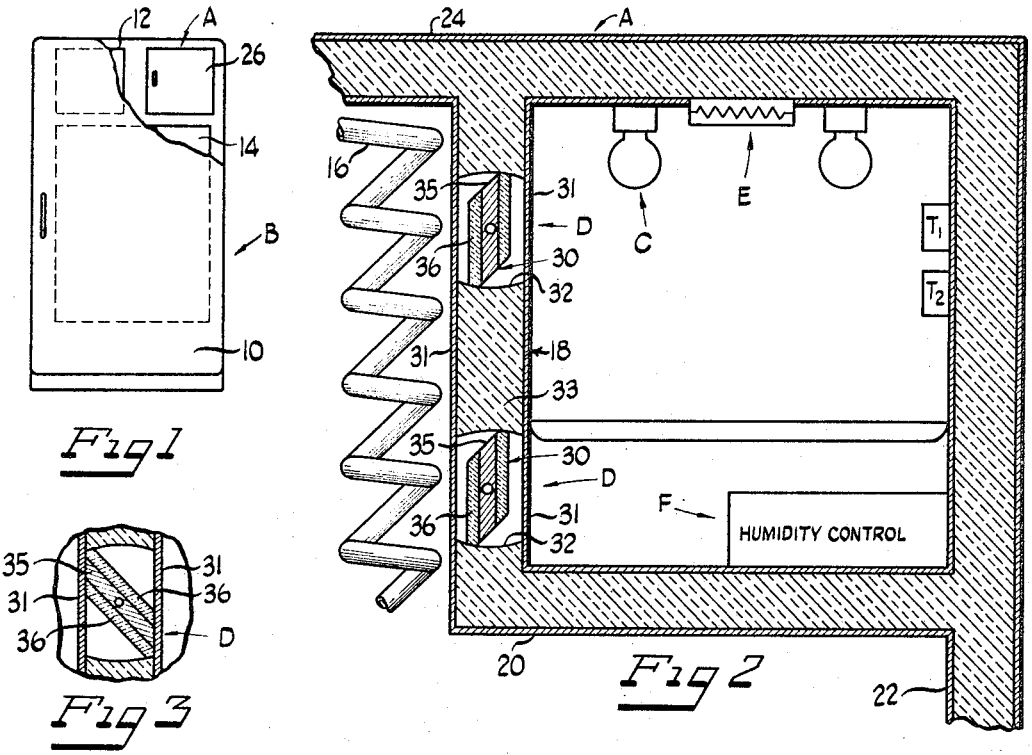
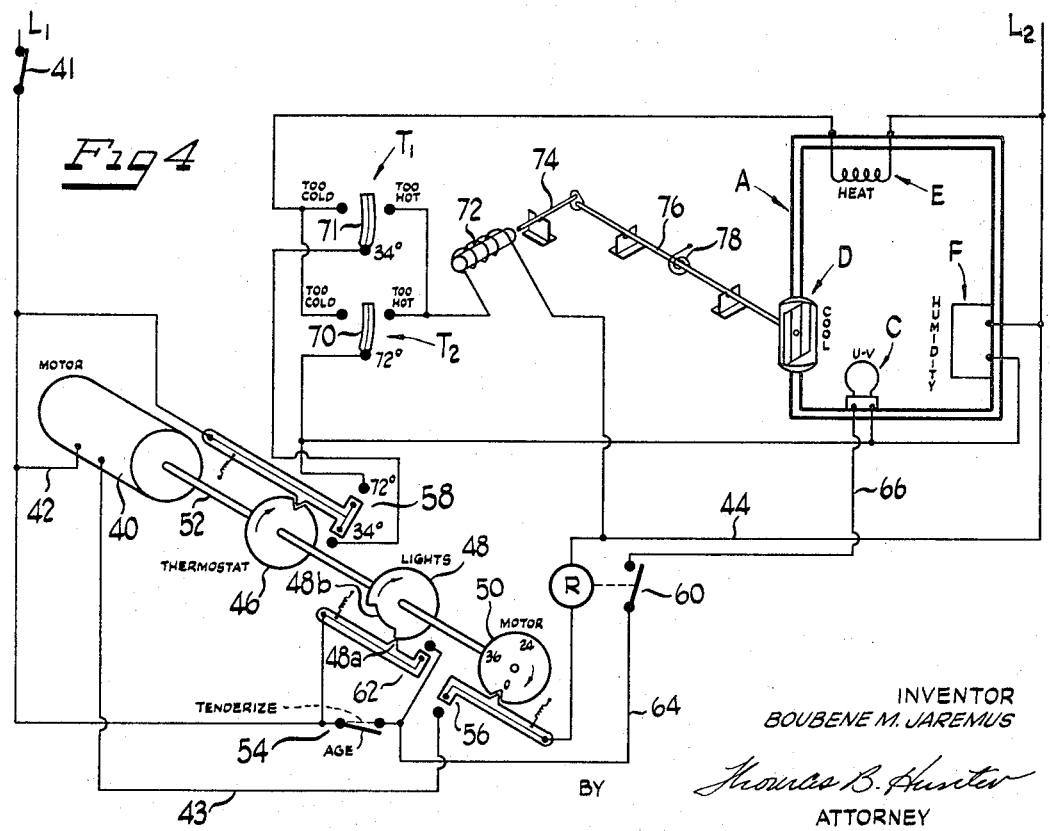
INVENTOR
BOUBENE M. JAREMUS
ATTORNEY

United States Patent Office 3,377,941
Patented Apr. 16, 1968

3,377,941
REFRIGERATOR WITH MEAT AGING AND TENDERIZING COMPARTMENT
Boubene M. Jaremus, Barrington, Ill., assignor to Borg-Warner Corporation, Chicago, Ill., a corporation of Illinois
Filed Oct. 14, 1965, Ser. No. 495,793
6 Claims. (Cl. 99—271)

ABSTRACT OF THE DISCLOSURE

A meat aging and tenderizing compartment suitable for use in a conventional refrigerator which includes a programmed temperature control system. The temperature is controlled, in part, by varying the conduction of heat through the wall of the compartment. A movable element forms a conductive bridge between the inside and the outside of the compartment in one position and an insulating barrier in a second position. Suitable humidity controls and an ultra-violet sterilizing element are also provided.

---

This invention relates to meat aging and tenderizing apparatus, and more particularly to a meat storage and processing compartment in combination with a conventional domestic refrigerator.

Various meat aging and tenderizing processes are known in the prior art, but almost without exception such known processes are only suitable for large scale, commercial operations such as by meat packers and restaurants. Recently, however, certain processes have been developed which drastically reduce the aging time required to impart an aged, walnut-like flavor to meat and thereby clear the way for domestic aging of individual cuts of meat, i.e. steaks and chops, etc. An example of such a process is described in U.S. Patent 2,926,089, issued to Beverly E. Williams on Feb. 23, 1960.

In brief, the Williams' patent describes a rapid meat aging process employing an aging accelerator consisting of a class of molds known as Phycomysetes, and more particularly to a sub-genus of such molds known as Thamnidium. According to the patentee, this process is effective to complete the aging and ripening of meat, and also improve its tenderness, in a period of approximately 48 hours. This is in contrast to known processes now taking up to 21 days to achieve the same results.

As pointed out above, the present invention is more particularly directed to a domestic refrigerator which is provided with a special compartment which is adapted to practice a process similar to that described in the aforementioned Williams' patent. The compartment is provided with suitable temperature controls such that after the meat aging or tenderizing process is completed, the temperature is automatically reduced to a level which is suitable for maintaining the meat under storage conditions for an indefinite period of time. Moreover, this storage compartment is completely isolated from the remainder of the refrigerator so that undesirable odors from the meat undergoing aging are not imparted to other food in the refrigerator. The compartment is also furnished with means for selectively varying the rate at which heat is abstracted from the storage compartment by means of one or more variable heat conductor elements which are adapted to be placed in a first position whereby heat is conducted at a relatively high rate and in a second position which thermally insulates the meat storage zone from the other cold storage areas in the refrigerator.

It is, therefore, a principal object of the present invention to provide an improved meat tenderizing and aging compartment which is adapted to maintain the proper temperature during various stages of a meat aging/tenderizing process and reduce the temperature level to optimum storage conditions after the process is completed.

It is a further object of the present invention to provide such a meat tenderizing and aging compartment in combination with a timer control circuit which automatically actuates the various components, such as ultra-violet lights for sterilizing the meat, the humidity control, etc., and also programs the temperature maintained in the compartment according to a predetermined schedule.

Additional objects and advantages of the present invention will be obvious from reading the following detailed description with reference to the accompanying drawings wherein:

FIGURE 1 is a front elevation view of a conventional domestic refrigerator with a portion of the access door broken away to show the various compartments in the refrigerator;

FIGURE 2 is a cross-sectional view illustrating a meat storage compartment constructed in accordance with principles of the present invention;

FIGURE 3 is a partial cross-sectional view showing one of the temperature control elements in its high heat transfer position; and FIGURE 4 is a schematic diagram of the various components associated with the meat storage compartment together with a temperature control circuit for energizing the same.

In general, the drawings show a meat storage and processing compartment A which is arranged within a portion of a conventional refrigerator B, said compartment including sterilizing unit C, means D for selectively controlling the rate at which heat is removed from the compartment, a heater E and a humidification unit F.

More particularly, and with reference to FIGURES 1 and 2, the refrigerator B is shown as being of a conventional upright design with front access door 10. Although the arrangement of the various zones is unimportant to the instant invention, the usual freezing compartment 12 is shown in the upper portion and a cold storage zone 14, which is maintained at above freezing temperatures, is arranged underneath. The meat storage compartment A is located adjacent the freezer section 12 so that it may be in communication with an evaporator coil 16 associated with the freezing compartment for a purpose to be described in greater detail below.

As shown best in FIGURE 2, the meat processing and storage compartment A is provided, in part, by insulated walls 18 and 20 which are associated with the refrigerator side wall 22 and top wall 24. Access to the storage zone is through a tightly fitting, hinged door 26 (FIGURE 1) which is also preferably made of insulating material.

Partition wall 18 is provided with means D for varying the rate at which heat is abstracted from the storage zone A. In a preferred embodiment, such means take the form of one or more pivotally mounted louvers or dampers 30, which are arranged between the inner and outer liner walls 31 which are made of metal sheet stock such as aluminum, or other thermally conductive material overlying openings 32 through the sandwiched layer of insulation 33 in wall 18. Each damper comprises a core 35 of metal such as aluminum or copper having a high coefficient of thermal conductivity and an outer layer 36 of insulation such as cork or polystyrene foam. When the dampers are in the position shown in FIGURE 2, it will be noted that the insulation layers are arranged so as to effectively block the path of thermal conduction; but in the alternative position shown in FIGURE 3, the metal core is arranged so it contacts the vapor sealing inner and outer liner walls 31 and therefore provides a direct thermal path for heat to be conducted therethrough. In both positions, the storage zone is effectively isolated from other parts of the refrigerator.

The control system

In accordance with the present invention, the meat compartment can be operated both as a conventional low temperature refrigeration space or as a meat processing compartment which maintains the necessary environment to carry out various known meat aging and/or tenderizing processes. For purposes of explanation, the control cycles for two different processes will be described—one a variation of the Williams' Thamnidium aging process and the other a conventional meat tenderizing process employing ultra-violet radiation.

Referring now to FIGURE 4, timing motor 40, when energized through line $L_1$, switch 41 and conductors 42, 44 and $L_2$ is adapted to drive a plurality of cams 46, 48, and 50 which are carried on the shaft 52, driven by said timing motor. Two thermostats $T_1$ and $T_2$ are adapted to control the temperature within the compartment and will maintain such temperature at a lower level (about 34° F.) when thermostatic switch $T_1$ is controlling the operation, and at a higher temperature level (about 72° F.), when thermostatic switch $T_2$ is controlling the operation. Assuming that it is desired to put the meat through an aging cycle, a selector switch 54 is placed in an open position corresponding to the AGE position. The cam shaft 52 is then advanced manually to close cam operated switch 56 and complete a circuit through the timing motor to energize the motor and begin the rotation of the cams in the direction shown by the arrows. Initial movement of the shaft 52 also shifts cam follower associated with switch 58 out of its detent to close the upper contacts and place the storage compartment temperature under the control of high level thermostat $T_2$.

It will be noted that the circuit through the timer motor 40 is in series with a relay R and the humidification unit F, the latter being of any conventional type operative to maintain the relative humidity in the compartment at the proper value (about 90%). Energization of relay R closes a switch 60 in series with the ultraviolet lamps or other sterilizing means C. During the aging cycle, it is desirable to have the ultra-violet lamps energized only for the last 8–10 hours of the 48 hour cycle so cam controlled switch 62 is placed in series with switch 60 and the lamps. During the first 38–40 hours, switch 62 is open; but upon the expiration of this period, it closes when the follower 48a drops into detent 48b on cam 48 and completes a circuit through switches 60 and 62 and conductors 64 and 66 to the lamps.

After approximately 48 hours, the aging cycle is completed and the timer motor 40 has returned the cams to their original positions such that motor switch 56 is opened and the high and low temperature control switch 58 moves back to close the lower contacts and place the temperature of compartment under the control of low level thermostatic switch $T_1$.

An important aspect of the invention is the manner in which the temperature within the storage compartment A is maintained at different levels while at the same time insuring complete isolation of the storage zone from the other zones within the refrigerator. The variable heat transfer elements D are actuated by means of a mechanical linkage operated by thermostats $T_1$ and $T_2$. The normal position for the dampers 30 is that shown in FIGURE 2, i.e. wherein the dampers are arranged vertically so that the metal core element 35 is not bridging either of the liner walls 31. Assuming that the control is under the operation of the high temperature thermostat $T_2$, if the temperature rises above a predetermined value, the bi-metal element 70 (or equivalent capillary bulb and switch) moves to the right to close the right-hand contact and energize a solenoid 72. When solenoid 72 is energized, it pulls the actuating rod 74 and rotates shaft 76 against the bias of a spring 78 and pivots the dampers 30 to their high heat transfer positions in FIGURE 3. As explained above, with the thermally conducting core 35 in intimate contact with both of the liner walls 31, this configuration provides an excellent heat flux path so that heat is rapidly conducted from the storage zone to the outside wall of the compartment which preferably is close to the evaporator coil 16. When the temperature responsive element 70 (or 71) moves away from the right-hand contact to an intermediate position, the solenoid 72 is de-energized and the dampers 30 returned to their non-heat conducting position by spring 78. If the temperature within the storage compartment drops below the design level by a predetermined amount, the left-hand contacts are closed to energize a small heater E disposed within the compartment, the damper elements remaining in their relatively non-heat conducting position while the heater is energized. While the thermostats $T_1$ and $T_2$ are shown schematically in FIGURE 4 as being outside of the confines of the compartment defining wall structure, it should be understood that these are actually located in a position to sense the temperature of the air within the compartment either by physically being located within the compartment or by means of a capillary bulb or other suitable means leading outside to a temperature responsive switch.

When it is desired to tenderize the meat rather than age it by the use of Thamnidium or some other aging activator, the selector switch 54 may be placed in the TENDERIZE position (FIGURE 4). This completes a parallel circuit around the cam actuated lamp switch 62 so as to maintain the ultra-violet lamps energized throughout the entire 48 hour cycle. When the timer motor switch 56 is closed, this completes a circuit through the relay R, closing switch 60 and thus energizes the ultra-violet lamps through $L_1$, switch 54, line 64, switch 60, line 66, and $L_2$. After approximately 48 hours of ultra-violet treatment at 72° F., the cams return to their starting position to discontinue the circuit through the timer motor, the lamps, the humidity control element, and at the same time, shift the temperature level control switch 58 to the low temperature level position.

While this invention has been described in connection with a certain specific embodiment thereof, it is to be understood that this is by way of illustration and not by way of limitation; and the scope of this invention is defined solely by the appended claims which should be construed as broadly as the prior art will permit.

What is claimed is:

1. In a refrigerator, means defining an insulated compartment isolated from other storage spaces within said refrigerator; temperature varying means operatively associated with said compartment, said temperature varying means including a heating element, a movable heat conducting element which is adapted to be placed in a first position, whereby it forms a heat conducting path between the inside and the outside of the compartment, and in a second position wherein said element forms an insulating heat barrier, actuating means for selectively placing said element in said first and second positions; a sterilizing unit operatively associated with said compartment; control means for actuating said temperature varying means and said sterilizing unit, said control means including a high temperature thermostat, a low temperature thermostat, a timing circuit for selectively maintaining the temperature in said compartment at different levels and controlling the energization of said sterilizing unit in accordance with a predetermined program and means actuated by said timing circuit for placing said temperature varying means under the exclusive control of said high or low temperature thermostat.

2. Apparatus as defined in claim 1 wherein said control means includes a cam element and associated switch to control the time period during which said sterilizing unit is energized; and means for selectively bypassing said timing circuit to maintain said sterilizng unit energized during the entire processing period.

3. Apparatus as defined in claim 1 wherein said compartment is at least partially defined by partition means having inner and outer walls of thermally conductive material and an intermediate core of insulating material, said heat conductive element being movable between said first position, wherein said element bridges said intermediate core and engages said inner and outer walls to augment heat conduction, and said second position wherein said heat conducting element is spaced from said walls to retard heat conduction.

4. Apparatus as defined in claim 1 wherein said control means includes a cam element and associated switch for controlling the time period that said temperature varying means is under the exclusive control of said high temperature thermostat.

5. Apparatus as defined in claim 1 wherein said sterilizing unit comprises a source of ultra-violet radiation.

6. Apparatus as defined in claim 5 including means for controlling and maintaining the relative humidity of the air in said compartment at a predetermined level, said humidity control means being energized only while said temperature varying means is under the exclusive control of said high temperature thermostat.

References Cited

UNITED STATES PATENTS

| | | | |
|---|---|---|---|
| 2,192,348 | 3/1940 | James | 99—107 X |
| 2,317,840 | 4/1943 | Wild | 62—441 X |
| 2,346,287 | 4/1944 | Borgerd et al. | 62—408 X |
| 2,384,203 | 9/1945 | Sperti | 99—218 |
| 2,492,308 | 12/1949 | Menges | 99—194 |
| 2,504,794 | 4/1950 | Berman et al. | 165—12 |
| 2,650,882 | 9/1953 | Sperti | 99—107 |
| 2,767,118 | 10/1956 | Gaymont | 165—12 X |
| 2,906,104 | 9/1959 | Schaefer et al. | 62—264 |
| 2,926,089 | 2/1960 | Williams | 99—107 |
| 2,932,573 | 4/1960 | Reiman | 99—107 |
| 3,050,956 | 8/1962 | Mann et al. | 62—408 X |

BILLY J. WILHITE, *Primary Examiner.*